(12) United States Patent
Gruzins et al.

(10) Patent No.: US 8,901,203 B2
(45) Date of Patent: Dec. 2, 2014

(54) PREPARATION OF A PYRITHIONE SALT DISPERSION USABLE IN URETHANE APPLICATIONS

(75) Inventors: Indulis Gruzins, Louisville, KY (US); Kiran B. Chandalia, Fairfield, CT (US); Brian L. Cooper, Corydon, IN (US); Thomas E. Robitaille, Douglasville, GA (US); Mauricio da Silva Franzim, São Paulo (BR)

(73) Assignee: Arch Chemicals, Inc., Norwalk, CT (US)

(*) Notice: Subject to any disclaimer, the term of this patent is extended or adjusted under 35 U.S.C. 154(b) by 1036 days.

(21) Appl. No.: 12/322,256

(22) Filed: Jan. 30, 2009

(65) Prior Publication Data

US 2010/0196506 A1    Aug. 5, 2010

(51) Int. Cl.
| | |
|---|---|
| C09D 5/16 | (2006.01) |
| C08G 18/08 | (2006.01) |
| C08G 18/70 | (2006.01) |
| C08G 18/00 | (2006.01) |
| C08F 6/00 | (2006.01) |
| C08J 3/00 | (2006.01) |
| C08G 18/63 | (2006.01) |
| C08L 75/00 | (2006.01) |
| C08G 18/28 | (2006.01) |
| C07C 249/00 | (2006.01) |
| C07C 251/00 | (2006.01) |
| C08K 3/34 | (2006.01) |
| C08K 5/378 | (2006.01) |
| C08G 18/48 | (2006.01) |
| C08G 18/76 | (2006.01) |
| C08K 5/00 | (2006.01) |
| C08G 101/00 | (2006.01) |

(52) U.S. Cl.
CPC .......... C08G 18/4825 (2013.01); C08K 3/346 (2013.01); C08K 5/378 (2013.01); *C08G 2101/0083* (2013.01); C08G 18/7621 (2013.01); *C08G 2101/005* (2013.01); C08K 5/0058 (2013.01); *C08G 2101/0008* (2013.01)
USPC ................. 523/122; 528/48; 528/67; 528/85; 528/480; 560/336; 524/700; 524/589; 524/590

(58) Field of Classification Search
USPC ................ 528/45, 48, 67–85, 480; 560/336; 524/700, 589, 590; 523/122
See application file for complete search history.

(56) References Cited

U.S. PATENT DOCUMENTS

| | | | |
|---|---|---|---|
| 2,809,971 A | 10/1957 | Bernstein et al. | |
| 3,029,209 A * | 4/1962 | Ferrigno | 521/76 |
| 3,227,666 A * | 1/1966 | Showalter | 521/122 |
| 4,086,297 A * | 4/1978 | Rei et al. | 524/330 |
| 4,401,770 A * | 8/1983 | Hance | 521/120 |
| 5,114,984 A | 5/1992 | Branch et al. | |
| 5,756,450 A * | 5/1998 | Hahn et al. | 514/20.5 |
| 5,859,081 A * | 1/1999 | Duffy | 521/133 |
| 6,294,589 B1 | 9/2001 | Moody | |
| 2002/0137832 A1 | 9/2002 | Ogoe et al. | |
| 2005/0048276 A1 * | 3/2005 | Wilson | 428/317.9 |
| 2006/0251688 A1 | 11/2006 | Gajanan et al. | |
| 2007/0227748 A1 * | 10/2007 | Liggat et al. | 169/45 |
| 2008/0206355 A1 | 8/2008 | Schwartz et al. | |

OTHER PUBLICATIONS

ZPT ChemCAS MSDS Oct. 1997 13463-41-7 {http://www.chemcas.com/msds/cas/msds142/13463-41-7.asp}.*
Albia Zinc Omadine data sheet 1999 {Albia.com http://lylixing.en.alibaba.com/product/291795800-209698035/zinc_pyrithione_Zinc_Omadine_ZPT_97_50_wonderful_antiseptics.html}.*
As evidenced by Engineering Toolbox ({http://www.engineeringtoolbox.com/dynamic-absolute-kinematic-viscosity-d_412.html} Online Feb. 9, 2006).*
Merriam-Webster ({http://www.merriam-webster.com/dictionary/glycol} posted online Apr. 23, 2009 per Wayback Machine { http://web.archive.org/web/20090501000000*/http://www.merriam-webstercom/dictionary/glycol}).*

* cited by examiner

*Primary Examiner* — Patrick Ryan
*Assistant Examiner* — Aaron Greso
(74) *Attorney, Agent, or Firm* — Dority & Manning, P.A.

(57) ABSTRACT

The present invention relates to a stable pyrithione salt polyol dispersion containing a pyrithione salt(s) in particulate form, a polyol and a stabilizer such as a rheological additive. The dispersion can be incorporated into existing polyurethane formulations without additional formula adjustment. Polyurethane foams produced from the composition containing pyrithione salt polyol dispersion of the present invention have more open cell structures, than those produced with a typical commercially available pyrithione salt thus providing a soft comfortable feeling.

14 Claims, No Drawings

PREPARATION OF A PYRITHIONE SALT DISPERSION USABLE IN URETHANE APPLICATIONS

FIELD OF THE INVENTION

This invention relates generally to a pyrithione salt dispersion usable in urethane applications, more specifically, a stable dispersion of pyrithione salt(s) in a polyol and the antimicrobially active polyurethane produced therefrom.

BACKGROUND OF THE INVENTION

Pyrithione salts, such as zinc pyrithione, are known to provide excellent antimicrobial activity, including broad spectrum anti-bacterial and anti-fungal activity. Pyrithiones have been widely used in various applications, for example, metal working fluids, paints and personal care compositions such as shampoos. Pyrithiones also have utility in urethane applications, such as shoe inserts and beddings.

Unfortunately, some of the useful pyrithione salts are solids, and the use of solids, such as powders, in the formulating and processing of polyurethanes is undesirable for environmental and safety concerns since the handling of a powder is generally a dusty process. Moreover, it has been difficult to effectively incorporate solid pyrithione salts such as pyrithione powders directly into polyurethanes since it is hard to evenly disperse these salts in polyurethanes.

Efforts have been made in the past to introduce pyrithione salts into polyurethanes. By way of illustration, U.S. Pat. No. 5,114,984 discloses a process for producing an antimicrobially effective polyurethane which includes the steps of dissolving a pyrithione salt(s) in an alkanolamine to provide a dissolved pyrithione salt, incorporating the dissolved pyrithione salt into a polyol to provide a liquid mixture and reacting the liquid mixture with a polyisocyanate to produce a polyurethane having antimicrobial activity. However, alkanolamines are catalytically active components in polyurethane reactions. Therefore, the pyrithione salt alkanolamine solution can't be added to the existing polyurethane formulae directly without adjusting these formulae beforehand. This causes inconvenience and is generally undesirable in commercial settings. Further, the solution of pyrithione salts in alkanolamines may be of very high viscosity. Sometimes, paste-like substances are formed because of strong hydrogen bonding arising between polar alkanolamines and pyrithione salts, which makes the pyrithione salt alkanolamine solution difficult to handle.

Another approach to incorporate pyrithione salts into polyurethanes is by including an aqueous dispersion of pyrithione salts in the polyurethane forming composition. Compared with solid pyrithione salts, aqueous pyrithione salt dispersion is easier to handle. However, water is a foaming agent in flex foam formulations and is unacceptable in many non-foam applications such as coatings, elastomers and sealants. Accordingly, formula adjustment is needed before an aqueous pyrithione salt dispersion can be added to any flex foam and non-foam formulations. In addition, the polyurethane foams produced in the presence of aqueous dispersion of pyrithione salts tend to have closed cell structures. It is known that foams having closed cells have low air flow property. Such foams normally feel uncomfortable and undesirable in many situations.

U.S. Pat. No. 6,294,589 discloses a process to incorporate a partially encapsulated antimicrobial agent such as zinc pyrithione into polyurethanes. The process includes the steps of at least partially encapsulating an antimicrobial agent with a plasticizer material and dispersing the encapsulated antimicrobial agent into at least one of either the components used to fabricate the polyurethane or the mixture into which the components are combined to create the polyurethane. However, the additional step of encapsulating the antimicrobial agent adds cost to the production of polyurethane and may not be desirable.

As such, it is appreciated that there is still a need for an easy and cost efficient method that effectively disperse pyrithione salts uniformly throughout the polyurethanes.

SUMMARY OF THE INVENTION

In one aspect, the present invention relates to a stable pyrithione polyol dispersion useful for polyurethane applications. The dispersion contains: (a) a polyol, and (b) a pyrithione salt in particulate form having a particle size of less than 100 microns; and (c) a stabilizer effective to physically stabilize the dispersion, where the polyol is present in an amount of from about 50% to about 90%, the pyrithione salt is present in an amount of from about 1% to about 50% and the stabilizer is present in an amount of from about 1% to about 20%, based upon the total weight of the dispersion. Preferably, the pyrithione salts have a particle size of less than 100 microns (measured using wet sieve method), more preferably, less than 35 microns. Preferably, the stabilizers are rheological additives such as Claytone HY made by Southern Clay Products, Inc.

In another aspect, the present invention relates to a process for producing an antimicrobially effective polyurethane which comprises the steps of: (a) dispersing a pyrithione salt(s) in particulate form having a particle size of less than 100 microns in a polyol in the presence of a stabilizer to provide a dispersion having a viscosity of from about 1,000 cps to about 15,000 cps, (b) contacting the dispersion with a polyurethane forming formulation to provide a liquid mixture, and (c) reacting the mixture to produce a polyurethane characterized by uniform antimicrobial effectiveness throughout the polyurethane. In another aspect, steps (a) and (b) are carried out simultaneously, and in still another aspect, steps (a), (b) and (c) are carried out simultaneously.

In still another aspect, the present invention relates to a polyurethane forming composition comprising: (a) a polyol, (b) a polyisocyanate, (c) a catalyst, (d) an antimicrobially effective amount of pyrithione salt in particulate form having a particle size of less than 100 microns, and (e) a stabilizer. The composition may additionally contain surfactants, blowing agents, ingredients suitable for a particular application and combinations thereof. Preferably, the pyrithione salts have a particle size of less than 50 microns, more preferably less than 35 microns.

In yet another aspect, the present invention relates to the polyurethane produced by reacting the above polyurethane forming composition.

These and other aspects will become apparent upon reading the following description of the invention.

DETAILED DESCRIPTION OF THE INVENTION

It is surprisingly found that pyrithione salts in particulate form can be uniformly dispersed in a polyol in the presence of a stabilizer, such as a rheological additive to form a dispersion having a low viscosity. The dispersion is stable and has a long shelf life. It can be conveniently incorporated into existing polyurethane formulations without additional formula adjustment. Further, compared with polyurethane foams made in the presence of aqueous dispersions of pyrithione salts, polyurethanes foams produced from the composition containing pyrithione salt polyol dispersion have more open cell structures, thus providing a soft comfortable feeling.

Pyrithione salts useful in the present invention include sodium pyrithione, potassium pyrithione, lithium pyrithione, ammonium pyrithione, zinc pyrithione, copper pyrithione, calcium pyrithione, magnesium pyrithione, strontium pyrithione, silver pyrithione, gold pyrithione, manganese pyrithione, zirconium pyrithione, and combinations thereof. The preferred pyrithione salt is zinc pyrithione. Zinc pyrithione is produced by reacting 1-hydroxy-2-pyridinethione or a soluble salt thereof with a zinc salt, such as zinc sulfate, to form a zinc pyrithione precipitate, as disclosed in U.S. Pat. No. 2,809,971.

The pyrithione salts suitable for the present invention preferably have a particle size of less than 100 microns, more preferably less than 50 microns, even more preferably, less than 35 microns. Any conventional methods such as grounding can be used to obtain pyrithione salts having desired particle sizes. Small particles of pyrithione salts can also be prepared by controlling the conditions of the reaction to prepare the pyrithione salts.

The stabilizer used herein means an agent effective in physically stabilizing the pyrithione salt polyol dispersion so that the solid pyrithione salt will not separate out or settle from the liquid polyol. Preferably, stabilizers are rheological additives. The Theological additives useful in the present invention include organoclays (surface treated and not surface treated). Exemplary organoclays are Claytone and Tixogel products made by Southern Clay Products, Inc. Other suitable classes of rheological additives include, but not limited to, fumed silica, synthetic silicates, urethane based associative thickeners, castor oil based thixotropes and other organic thixoptropes. The preferred rheological additives include Clayton HY (Southern Clay Products), Thixcin and Bentone (Elementis Specialties). The more preferred rheological additive is Claytone HY, which consists of montmorillonite clays that are reacted with quaternary ammonium compounds. These rheological additives greatly improve the stability of the pyrithione salt polyol dispersion, yet at the same time, remain inert to the polyurethane forming reaction. Optionally, dispersants, such as Solsperse 1700 and Solsperse 2000 (Lubrizol Limited) can be used to improve the efficiency of rheological additives.

The polyols (polyester, polyethers) which are used in the subject invention are those known in the art and are preferably those having a low viscosity. The preferred polyols are polyether polyols that can be used in the production of polyurethanes. Preferably, the polyether polyol has a molecular weight of from about 200 to about 12,000 and a functionality of from 1 to 8. The polyether alcohols are prepared by the reaction of an alkylene oxide with polyhydric or polyamine-containing compounds, or mixtures thereof. Exemplary alkylene oxides which may be employed in the preparation of the polyols of the present invention include ethylene oxide, propylene oxide, butylene oxide, styrene oxide and the like. Halogenated alkylene oxides may also be used such as epichlorohydrin, 3,3,3-trichlorobutylene oxide, etc. Mixtures of any of the above alkylene oxides may also be employed. The preferred alkylene oxide is propylene oxide, ethylene oxide, or a mixture thereof. Useful polyhydric compounds include ethylene glycol, propylene glycol, diethylene glycol, dipropylene glycol, polytetramethylene ether glycol, glycerol, pentaerythritol, sorbitol, sucrose, methyl glucoside glucose, etc. The preferred polyhydric compound is polytetramethylene ether glycol.

The dispersion of pyrithione salts in polyol can be prepared by any conventional means known by a person in the field. The dispersion according to the present invention contains from about 1% to about 50% of a pyrithione salt, from about 1% to about 20% of a stabilizer and from about 50% to about 90% of a polyol. Preferably, the pyrithione salt is present in an amount of from about 10% to about 25%, the stabilizer is present in an amount of from about 1% to about 10% and the polyol is present in an amount of from about 70% to about 90%, based upon the total weight of the dispersion. The pyrithione dispersion according to the invention has a viscosity of from about 1,000 cps to about 15,000 cps.

If desired, other biocides known in the art can also be incorporated into the pyrithione/polyol dispersion to obtain enhanced antimicrobial efficacy. Exemplary biocide that may be used in the dispersion include but not limited to isothiazolinones such as benzisothiazolinone (BIT), N-n-butyl-1,2-benzisothiazolin-3-one (BBIT), 2-n-octyl-4-isothiazolin-3-one (OIT), 4,5-dichloro-2-n-octyl-4-isothiazoline-3-one (DCOIT), polyhexamethylene biguanidine (PHMB), Polyhexamethyleneguanidine phosphate (PHMG), tributyltin maleate, tributyl tinoxide (TBTO), 10-10'oxybisphenarsine, (OBPA,) Tebuconazole, inorganic silver compounds, 3-iodo propynyl butyl carbamate (IPBC), N-(Trichloromethylthio) phthalimide (Folpet), Methyl 2-benzimidazolecarbamate (BCM), tetrachloroisophthalodinitril, thiabenadzole, diiodomethyl-p-tolysulphone, 2,4,4'-tricloro-2'-hydroxy-diphenylether, borate compounds and combinations thereof.

The pyrithione salt dispersion according to the present invention can be suitably incorporated into any known polyurethane forming formulations without adjusting the polyurethane formulae. Polyurethane forming formulations normally include a combination of a polyol component and an isocyanate component and a catalyst promoting the reaction between the polyol component and the isocyanate component. In one embodiment, the pyrithione salt dispersion of the invention is incorporated into the polyol component first to make a uniform liquid dispersion. Then the liquid is mixed with the isocyanate component and the catalyst to produce a polyurethane forming composition containing pyrithione salts. Depending on the end use of the polyurethanes produced, other formulation ingredients such as surfactants, blowing agents, flame retardants and any suitable ingredients known to a person skilled in the art can also be included in the polyurethane forming formulations of the present invention. In another embodiment, the pyrithione dispersion of the invention is directly added to an existing polyurethane forming composition containing a polyol component and a polyurethane component, optionally along with other ingredients like catalysts, surfactants, blowing agents, flame retardants etc. In yet another embodiment, the dispersion of pyrithione and polyol can be added to the prepolymer formed by reacting the polyol component and the isocyanate component.

The polyurethane forming mixture subsequently reacts and forms polyurethane having uniformly dispersed therein pyrithione salts. Methods for the formation of polyurethanes from reacting a polyol compound and a polyisocyanate compound is known in the art. Any known combination of polyol and isocyanate can be used in the present invention.

If a polyurethane foam product is desired, suitable blowing agent(s) are employed in order to achieve the blowing of the foam. Suitable blowing agents include halocarbons, such as monochlorodifluoromethane, or non-halocarbons, such as water which produces blowing by virtue of carbon dioxide production during the polyurethane forming reaction. Generally speaking, the amount of blowing agent employed depends upon the desired density. Thus, if low density forms, i.e., 1.0 to 6 pounds per cubic foot, are desired, the amount of the halogenated-hydrocarbon blowing agent, if used, is between about 5 and about 25 percent by weight based on the total weight of the foam formulation.

Optional additives such as dispersing agents, cell stabilizers, surfactants, flame retardants, and the like, which are commonly employed in the fabrication of polymer foams, can be employed in the process of the invention. For example, the well-known phosphorus-based flame retardant additives may be used if flame retardancy is desired. These phosphate additives generally do not adversely affect the physical properties of the foam even if they are hydrolyzed and/or physically removed from the foam since these additives are not part of the foam backbone.

Other optional additives, such as inorganic and organic fillers, can be employed in the process of this invention. Illustrative inorganic fillers are calcium carbonate, silica, glass, antimony oxides, etc. Illustrative organic fillers are the various polymers, copolymers of vinyl chloride, vinyl acetate, acrylonitrile, styrene, melamine, partially oxyalkylated melamine, etc. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

It is preferred in preparing the polyurethane foams of the invention to include in the foam forming reaction mixture a small proportion of a conventional surfactant in order to improve the cell structure of the resulting foam. Typical such surfactants are the silicones and the siloxaneoxyalkylene block copolymers. If used, generally between about 0.2 and about 5 parts by weight of surfactant are employed per hundred parts of polyol.

The pyrithione salt is incorporated into the polyurethane forming formulation in an amount sufficient to provide antimicrobial effectiveness in the resulting polyurethane. "Antimicrobial effectiveness" is intended to designate that the polyurethane product, for example, the foam, adhesive, elastomer, coating or sealant product, is inhibited against fungicidal or other microbial growth on, and within, the product. Preferably, between about 10 ppm and about 10,000 ppm, more preferably between about 200 ppm and about 5,000 ppm of pyrithione salt are employed based upon the weight of the polyurethane forming formulation.

Utilizing the pyrithione dispersion of the present invention, the pyrithione salt, and its associated antimicrobial effectiveness, is uniformly distributed throughout the polyurethane product. In addition, the polyurethane foams produced from the polyurethane forming compositions of the invention have sufficient amounts of open cell structures which provides the foams a soft and comfortable feeling.

While the invention has been described above with references to specific embodiments thereof, it is apparent that many changes, modifications and variations in that materials, arranges of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

The following examples are intended to illustrate, but in no way limit the scope of, the present invention.

EXAMPLES

Example 1

Preparation of Zinc Pyrithione Dispersion in Polyol and its Properties

A difunctional polyether polyol compound, Poly-G 20-56 (154 grams), commercially available from Arch Chemicals, Inc., and Claytone HY (10 grams, powder from Southern Clay Products) were charged into a 600 mL plastic beaker. The mixture was premixed with a spatula. Micronized zinc pyrithione powder (36 grams), commercially available as zinc OMADINE™ bactericide-fungicide from Arch Chemicals, Inc., was added to the beaker. The resulting mixture was premixed with a spatula and then mixed at 5000 rpm using a high shear Cowles type dispersator for 1 minute. Any solids adhered to the walls and the bottom of the beaker were scraped back to the dispersion. The dispersion was stirred at 5000 rpm for one more minute. The temperature at the end of mixing reached 50-55° C.

Four batches of pyrithione/polyol dispersion, batches A-D, were prepared according to the above described procedure. Comparative dispersion F was prepared by using 154 grams of Poly-G 20-56 and 36 grams of micronized zinc pyrithione powder, but without Claytone HY. The procedure for mixing remained the same.

Hegman gauge reading of zinc pyrithione in the dispersion shows that the zinc pyrithione particles have a size of less than 25 microns. As shown in Table 1, the viscosities of the dispersions A-D are from 3,200 cPs to 4,400 cPs.

Dispersion stability studies were preformed in 10 cm high test tubes at room temperature. The separation was measured as percentage of linear separation. The height of liquid transparent layer on top (if any) was divided into total height of dispersion in the test tube. The stability test results are shown in Table 1.

TABLE 1

| Batch number | Claytone HY, % | Viscosity at 25 C. using spindle #4, 20 rpm, cP | Stability | |
|---|---|---|---|---|
| | | | Days | Separation |
| F | 0 | 1740 | 60 | 40% liquid on top |
| A | 5 | 4400 | 60 | No separation |
| B | 5 | 3570 | 60 | No separation |
| C | 5 | 3400 | 60 | No separation |
| D | 5 | 3200 | 60 | No separation |

From Table 1, it can be seen that after 60 days, there is no phase separation for dispersions A-D, all containing 5% of claytone HY. On the other hand, for comparative dispersion F, which does not include any rheological additive, the dispersion separates into two phases with 40% liquid on the top phase. Accordingly, the employment of 5% of claytone HY significantly improves the stability of the pyrithione/polyol dispersion.

Example 2

Properties of Foams Made Using ZPT Aqueous Dispersion and ZPT Polyol Dispersion

A dispersion of 48% zinc pyrithione in water (available from Arch Chemicals, Inc.) and a dispersion of 18% zinc pyrithione in polyol (made as described in Example 1) were added separately to a typical urethane foam formulation as shown in Table 2. Polyurethane foams were then formed by typical foaming techniques. The properties of the foams were studied and the results are shown in Table 2.

From Table 2, it can be seen that at the same percentage of active zinc pyrithione level, the air flow rate of the foams made with zinc pyrithione polyol dispersion was two times higher than the air flow rate of the foams made with zinc pyrithione aqueous dispersion. This indicates that foams made with zinc pyrithione polyol dispersions have more open cell structures than the foam made with zinc pyrithione aqueous dispersions.

TABLE 2

| | | | | | | | |
|---|---|---|---|---|---|---|---|
| Poly-G 32-52 (base polyol) | | 100.0 | 100.0 | 100.0 | 100.0 | 100.0 | 100.0 |
| BIOCIDE | type | Zn OMADINE 48% in Water | | | Zn OMADINE 18% in Polyol | | |
| | parts | 0.47 | 0.78 | 1.26 | 1.13 | 1.89 | 3.13 |
| % Active, ppm | | 1505 | 2495 | 4023 | 1498 | 2494 | 4096 |
| WATER | total | 4.4 | 4.4 | 4.4 | 4.4 | 4.4 | 4.4 |
| L-618[1] | | 1.00 | 1.00 | 1.00 | 1.00 | 1.00 | 1.00 |
| A-33[2] | | 0.18 | 0.18 | 0.18 | 0.18 | 0.18 | 0.18 |
| T 110[3] | | 0.17 | 0.17 | 0.17 | 0.17 | 0.17 | 0.17 |
| TDI[4] | parts | 54.7 | 54.7 | 54.7 | 54.7 | 54.7 | 54.7 |
| | index | 108.5 | 108.5 | 108.5 | 108.5 | 108.5 | 108.5 |
| CREAM TIME seconds | | 15 | 15 | 16 | 16 | 16 | 17 |
| RISE TIME, seconds | | 93 | 95 | 96 | 94 | 95 | 96 |
| BLOW OFF | | F | F | F | F | F | F |
| SETTLE (in.) inches | | 0.0 | 0.0 | 0.0 | 0.0 | 0.0 | 0.0 |
| DENSITY, PCF[5] | | 1.36 | 1.34 | 1.32 | 1.40 | 1.39 | 1.38 |
| AIR FLOW, CFM[6] | | 0.48 | 0.30 | 0.35 | 1.11 | 0.77 | 0.68 |
| IFD, pounds | | 41.5 | 40.1 | 39.8 | 42.5 | 45.2 | 41.2 |

[1]L-618 - silicone surfactant
[2]A-33 - amine catalyst
[3]T 110 - catalyst - stannous octoate
[4]TDI—toluene diisocyanate
[5]PCF—pounds per cubic foot
[6]CFM—cubic feet per minute

What is claimed is:

1. A process for producing an antimicrobially effective polyurethane which comprises the steps of:
    (a) dispersing a pyrithione salt(s) in particulate form having a particle size of less than 100 microns in a polyol in the presence of a stabilizer selected from the group consisting of organic clays, fumed silica, synthetic silicate, urethane based associative thickeners, thixotropes, and combinations thereof to provide a dispersion having a viscosity of from about 1,000 cps to about 15,000 cps at 25° C.,
    wherein the dispersion contains from about 10% to about 50% of the pyrithione salt, from about 1% to about 20% of the stabilizer and from about 50% to about 90% of a polyol based upon the weight of the dispersion,
    (b) contacting the dispersion with a composition containing a polyol component, an isocyanate component and a catalyst promoting the reaction between the polyol component and the isocyanate component to provide a liquid mixture, and
    (c) reacting the mixture to produce said antimicrobially effective polyurethane.

2. The process of claim 1 wherein steps (a) and (b) are carried out simultaneously.

3. The process of claim 1 wherein steps (a), (b) and (c) are carried out simultaneously.

4. The process of claim 1 wherein said pyrithione salt is selected from the group consisting of sodium pyrithione, potassium pyrithione, lithium pyrithione, ammonium pyrithione, zinc pyrithione, copper pyrithione, calcium pyrithione, magnesium pyrithione, strontium pyrithione, silver pyrithione, gold pyrithione, manganese pyrithione, zirconium pyrithione, and combinations thereof.

5. The process of claim 1 wherein said pyrithione salt has a particle size of less than 100 microns.

6. The process of claim 1 wherein said pyrithione salt has a particle size of less than 50 microns.

7. The process of claim 1 wherein said stabilizer is montmorillonite days that are reacted with quaternary ammonium compounds.

8. The process of claim 1 wherein said pyrithione salt is zinc pyrithione.

9. The process of claim 1 wherein said polyol is a polyether polyol having a molecular weight of from about 2000 to about 12,000 and a functionality of from 1 to 8.

10. A process for producing an antimicrobially effective polyurethane which comprises the steps of:
    (a) dispersing a pyrithione salt(s) in particulate form having a particle size of less than 100 microns in a polyol in the presence of a stabilizer selected from the group consisting of organic clays, fumed silica, synthetic silicate, urethane based associative thickeners, thixotropes, and combinations thereof to provide a dispersion having a viscosity of from about 1,000 cps to about 15,000 cps at 25° C.,
    wherein the dispersion contains from about 10% to about 50% of the pyrithione salt, from about 1% to about 20% of the stabilizer and from about 50% to about 90% of a polyol based upon the weight of the dispersion,
    (b) contacting the dispersion with a composition containing an isocyanate component and a catalyst promoting the reaction between the polyol and the isocyanate component to provide a liquid mixture, and
    (c) reacting the mixture to produce said antimicrobially effective polyurethane.

11. A process for producing an antimicrobially effective polyurethane which comprises the steps of:

(a) dispersing a pyrithione salt(s) in particulate form having a particle size of less than 100 microns in a polyol in the presence of a stabilizer being montmorillonite clays that are reacted with quaternary ammonium compounds to provide a dispersion having a viscosity of from about 1,000 cps to about 15,000 cps at 25° C.,
   wherein the dispersion contains from about 10% to about 50% of the pyrithione salt, from about 1% to about 20% of the stabilizer and from about 50% to about 90% of a polyol based upon the weight of the dispersion,
(b) contacting the dispersion with a composition containing a polyol component, an isocyanate component and a catalyst promoting the reaction between the polyol component and the isocyanate component to provide a liquid mixture, and
(c) reacting the mixture to produce said antimicrobially effective polyurethane.

12. The process of claim 1 wherein the dispersion produced at step (a) contains from about 10% to about 25% of the pyrithione salt, from about 1% to about 10% of the stabilizer, and from about 70% to about 90% of the polyol based on the weight of the dispersion.

13. The process of claim 10 wherein the dispersion produced at step (a) contains from about 10% to about 25% of the pyrithione salt, from about 1% to about 10% of the stabilizer, and from about 70% to about 90% of the polyol based on the weight of the dispersion.

14. The process of claim 12 wherein the dispersion produced at step (a) contains from about 10% to about 25% of the pyrithione salt, from about 1% to about 10% of the stabilizer, and from about 70% to about 90% of the polyol based on the weight of the dispersion.

* * * * *